US008985552B2

(12) United States Patent  
Udipi et al.

(10) Patent No.: US 8,985,552 B2
(45) Date of Patent: Mar. 24, 2015

(54) LOCK ASSEMBLY FOR HYDRAULIC FRACING VALVE

(75) Inventors: Mahesha Udipi, Houston, TX (US); Raymond Krolczyk, Houston, TX (US); Mark Viator, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 557 days.

(21) Appl. No.: 13/316,097

(22) Filed: Dec. 9, 2011

(65) Prior Publication Data

US 2013/0146153 A1   Jun. 13, 2013

(51) Int. Cl.
*F16K 31/00* (2006.01)
*F16K 3/02* (2006.01)
*F16K 35/04* (2006.01)

(52) U.S. Cl.
CPC .............. *F16K 3/0254* (2013.01); *F16K 35/04* (2013.01)
USPC ...... 251/297; 251/326; 137/384.2; 137/384.8

(58) Field of Classification Search
CPC ....... F16K 35/00; F16K 35/02; F16K 35/022; F16K 35/025; F16K 35/04; F16K 35/06
USPC ................... 251/297, 326–329, 193–204, 75, 251/101–102, 105–106, 108–110; 137/383, 137/384.2, 384.8
See application file for complete search history.

(56) References Cited

U.S. PATENT DOCUMENTS

| | | | | |
|---|---|---|---|---|
| 120,033 | A | * | 10/1871 | Butler ...................... 137/625.68 |
| 5,135,032 | A | * | 8/1992 | Parks, Jr. .................. 137/630.22 |
| 5,415,378 | A | * | 5/1995 | Craven .......................... 251/329 |
| 6,672,565 | B2 | * | 1/2004 | Russell ......................... 251/297 |
| 7,377,322 | B2 | | 5/2008 | Hofman |
| 7,383,884 | B1 | | 6/2008 | Turner et al. |
| 7,806,175 | B2 | | 10/2010 | Hickie |
| 7,823,634 | B2 | | 11/2010 | Chan et al. |
| 7,975,983 | B2 | | 7/2011 | Comeaux et al. |
| 2006/0278434 | A1 | | 12/2006 | Calderoni et al. |

FOREIGN PATENT DOCUMENTS

WO        2011151445  A2     12/2011

OTHER PUBLICATIONS

Search Report from corresponding GB Application No. GB1221451.6 dated Mar. 11, 2013.

* cited by examiner

*Primary Examiner* — Marina Tietjen
(74) *Attorney, Agent, or Firm* — Bracewell & Giuliani LLP

(57) ABSTRACT

A lock open device for use with a valve in a hydraulic fracturing system, which maintains the valve in an open position. The lock open device includes a plate with beveled edges and spring loaded ball bearings strategically disposed to contact the edges and interfere with axial movement of the plate. The plate couples to a gate member in the valve, so that the interference between the plate and the ball bearings maintains the valve in a designated open or closed position. The angle of the bevel regulates how much force is required to urge the plate past the ball bearings to thereby open/close the valve.

13 Claims, 3 Drawing Sheets

LOCK ASSEMBLY FOR HYDRAULIC FRACING VALVE

BACKGROUND

1. Field of Invention

The invention relates generally to production of oil and gas. More specifically, the invention relates to a locking assembly for use with a valve of a hydraulic fracing system.

2. Description of Prior Art

Hydrocarbon producing wellbores are sometimes stimulated to increase the production of hydrocarbons. Hydraulic fracturing, or fracing, is one example of stimulation, which involves pressurizing all or a portion of the wellbore to improve communication between the surrounding formation and the wellbore. Generally, a fracing fluid is pressurized at surface by a pump, which then enters a line having an end downhole. As the fluid exits the line it builds pressure in the wellbore that in turn produces, or further propagates, fractures in the formation. Subterranean fractures occur when the pressure exerted by the pumped fluid exceeds the fracture gradient of the formation strata. Typically, the fluid used for fracing includes one or more of water, acids, bauxite, carbon dioxide, nitrogen, and additives.

The high pressures formed during fracing, along with the impulses that occur when fractures are formed, create vibrations in the piping system that carries the fracing fluid. Vibrations of sufficient magnitude, and/or duration, can cause valves in the piping system to either inadvertently open or close.

SUMMARY OF THE INVENTION

An example of a hydraulic fracturing system is described herein that includes a pump, a discharge line attached to the pump that can be put in a wellbore. Also included is a valve assembly in the line; the valve assembly includes a body, a passage, a gate, and a bore in the gate that selectively registers with the passage. The system also includes a valve lock assembly that is made up of a cam disk, a balance stem connecting the cam disk and the gate and a retention element that is urged into a path of the cam disk by a resilient member. When a force is applied to the gate to urge the cam disk against the retention element that is less than a designated amount, the retention element is retained in the path of the cam disk by the resilient member. Optionally, when a force is applied to the gate to urge the cam disk against the retention element that exceeds the designated amount, a force is exerted by the cam disk onto the retention element to overcome a force applied by the resilient member and the retention element is moved out of the path of the cam disk. In one example, the cam disk includes a beveled outer edge that contacts the retention element. In an example embodiment, a thrust force is defined by the force applied to the gate to urge the cam disk against the retention element, and wherein upper and lower portions of the outer edge are beveled at angles with respect to an axis of the cam disk so that the thrust force necessary to urge the cam disk past the retention element is greater in one axial direction than in an opposite axial direction. The retention element can be made up of a ball bearing and the resilient member may be made of a spring. In one example, the system includes a plurality of ball bearings and springs and a housing that circumscribes the balance stem having bores radially formed through a sidewall of the housing for retaining the ball bearings and springs. A valve actuator may be coupled to the gate.

Also disclosed herein is a balancing system for use with a hydraulic fracturing valve. In one example the balancing system includes a generally planar cam member in selective coupling engagement with a valve gate. The cam member is subject to a thrust force from the valve gate in response to a force applied to the valve gate. A latching assembly is included that is made up of a latching element that is maintained in interfering contact with the cam member by a resilient member. The interfering contact takes place when the thrust force produces a resultant force against the latching element that is less than a designated amount. In one example, the latching element is urged out of interfering contact and out of a path of the cam member when the thrust force produces a resultant force against the latching element that exceeds the designated amount. The cam member can have an outer periphery with an upper section profiled at an angle with respect to an upper surface of the cam member and a lower section profiled at an angle with respect to a lower surface of the cam member. In an example embodiment, the upper and lower surfaces are substantially parallel, and wherein the upper and lower sections are profiled at different angles, so that an amount of the thrust force that produces a resultant force against the latching element that exceeds the designated amount is greater when the cam member is axially urged in one direction than when the cam member is axially urged in an opposite direction. The gate may be subjected to forces from vibrations that produce resultant forces that are less than the designated amount.

A valve assembly is provided herein that can be used in a hydraulic fracing system. In one example embodiment the valve assembly includes a valve body having a passage, a gate having a bore that is in selective registration with the passage, an actuator coupled with the gate, and a means for retaining the gate in a designated position within the valve body. The gate can be unlocked from the designated position by applying a force that exceeds a force used to lock the gate. Optionally, the means for retaining the gate are a cam disk coupled to the gate and a latch that retains the cam disk in place when the lock force is applied to the gate and releases the gate when an unlock force is applied to the gate.

BRIEF DESCRIPTION OF DRAWINGS

Some of the features and benefits of the present invention having been stated, others will become apparent as the description proceeds when taken in conjunction with the accompanying drawings, in which.

Figure 1:
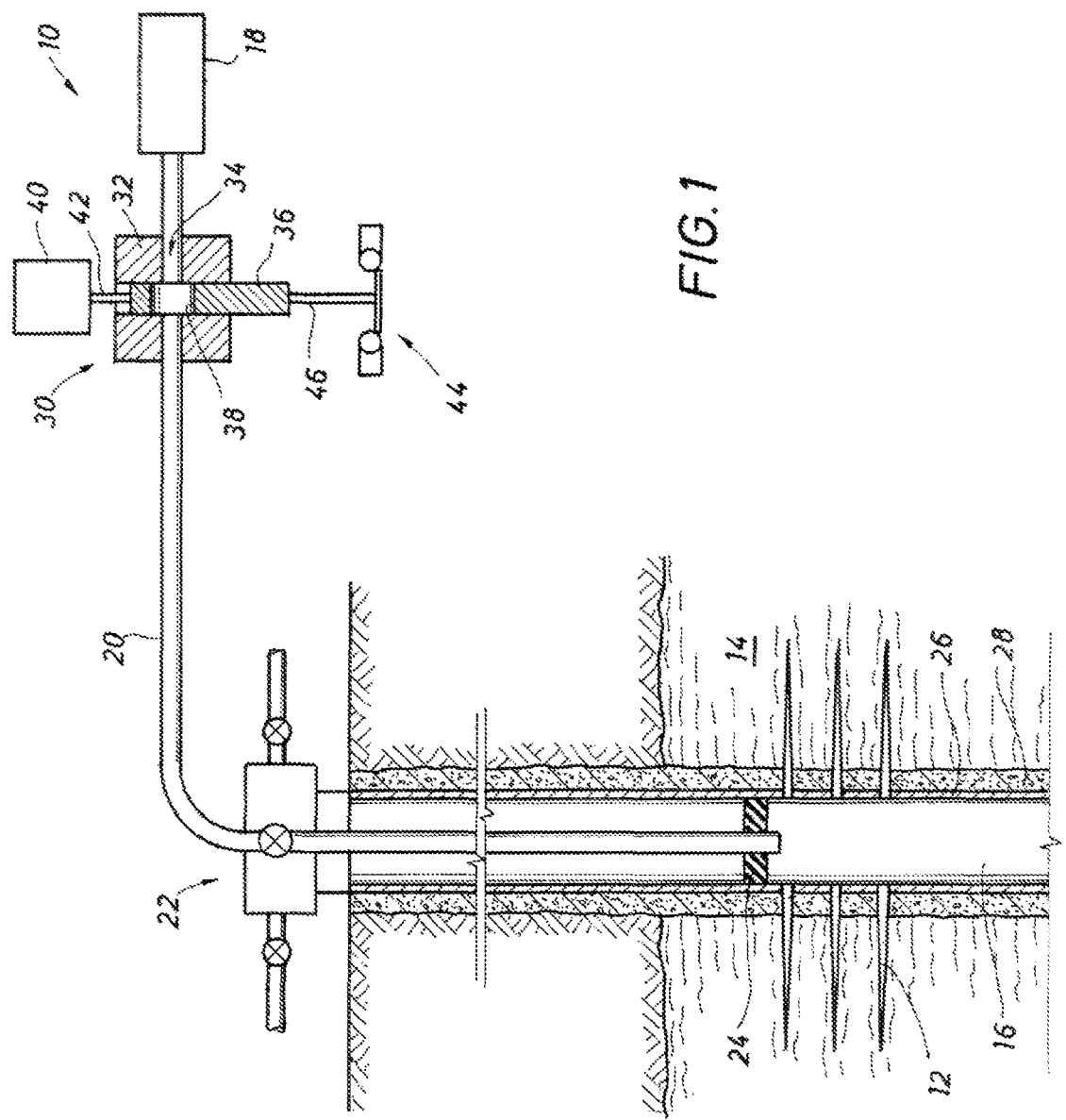
FIG. 1 is a side partial sectional view of an example embodiment of a hydraulic fracturing system in accordance with the present invention.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation. Accordingly, the improvements herein described are therefore to be limited only by the scope of the appended claims.

FIG. 1 is a partial side sectional view of an example embodiment of a hydraulic fracturing system 10 used in creating fractures 12 within a subterranean formation 14 by pressurizing a space within the wellbore 16. The system 10 includes a pump 18 that pressurizes a fracturing fluid and a line 20 connected to a discharge of the pump 18. The line 20 is shown fed through an optional wellhead assembly 22 and has an exit disposed in the wellbore 16. Optionally, a packer 24 may be provided in an annular space between the line 20 and inner walls of the wellbore 16 to isolate a zone of the wellbore 16 for the step of fracturing. In the example of FIG. 1, the wellbore 16 is lined with a string of casing 26 that is cemented in place in the formation with cement 28.

A valve assembly 30 is shown in the line 20 downstream of the pump 18 and upstream of the wellhead assembly 22. The valve assembly 30 of FIG. 1 includes a valve body 32 and a passage 34 that laterally extends through the body 32 and is in fluid communication with the line 20. A gate 36 is shown axially inserted within the valve body 32, wherein the gate 36 includes a bore 38 that selectively registers with the passage 34 for regulating the flow of fluid through the valve assembly 30. A valve actuator 40 is shown coupled with the gate 36 via a valve stem 42. Due to the high pressures and flow rates associated with the hydraulic fracturing process, substantial vibrations may be imparted onto the valve gate 36 that may move the gate 36 out of a designated position within the valve body 32. To retain the valve gate 36 in the desired position, a valve lock assembly 44 is shown coupled to an end of the gate 36 by a balance stem 46.

Figure 2:
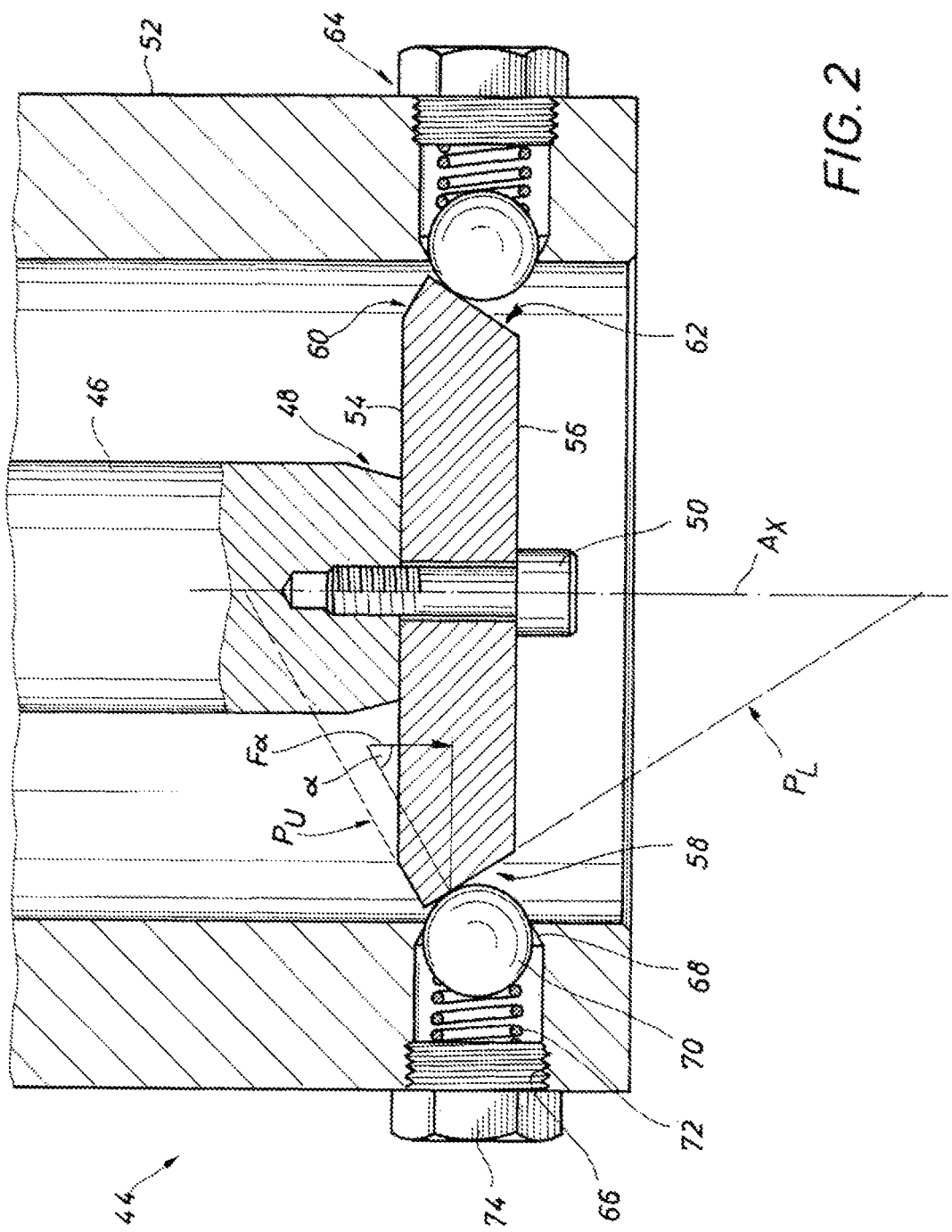
FIG. 2 is a side sectional view of a detailed portion of a balance stem of the embodiment of FIG. 1 shown in a locking configuration.

Referring now to FIG. 2, one example embodiment of the valve lock assembly 44 is shown in detail in a side sectional view. In this example, the valve lock assembly 44 is shown further including a generally planar-shaped cam disk 48 that mounts on a lower terminal end of the balance stem 46. In the example of FIG. 2, a threaded fastener 50 bolts the cam disk 48 in place on the stem 46. Further illustrated in FIG. 2 is a housing 52, that in one example is a substantially annular member having a cylindrical outer circumference. The cam disk 48 is shown having upper and lower surfaces 54, 56 that in the example of FIG. 2 are largely parallel with one another and transverse to an axis $A_X$ of the balance stem 46. The cam disk 48 also has an outer periphery 58 profiled to have an upper portion 60; as shown the upper portion 60 is coincident with a plane $P_U$ that intersects the axis $A_X$ above the cam disk 48 at an oblique angle. Similarly, a lower portion 62 is formed on the outer periphery 58 below the upper portion 60 that lies in a plane $P_L$ that intersects the axis $A_X$ at an oblique angle but below the cam disk 48. In the example of FIG. 2, the angle at which plane $P_U$ intersects the axis $A_X$ is different from the angle that $P_L$ intersects the axis $A_X$.

Further shown in FIG. 2 are retention assemblies 64 that are provided within bores 66 formed through a side wall of the housing 52. The bores 66 are shown having a radially inwardly directed taper 68 proximate to an inner wall of the housing 52. Ball bearings 70 are inserted within the bores 66 and have a diameter less than the diameter of the bore 66 but greater than that of the taper 68 so that a portion of the ball bearing 70 projects through the bore 66 to inside of the housing 52, but prevented from fully entering into the housing 52. A spring 72 is biases the ball bearing 70 against the taper 68 and is held in place against by bolts 74 that threadingly insert into the bores 66 from the outer surface of the housing 52. The inward biasing of the springs 72 positions a portion of the ball bearings 70 into interfering contact with an axial path of the cam disk 48. More specifically, in the example of FIG. 2, a force diagram is shown that is based on an angle α of the lower portion 62. In this example, a force Fα in the force diagram depicts an amount of force required to urge the ball bearings 70 radially outward against the springs 72 so that the cam disk 48 may move axially downward past its current location.

Figure 3:
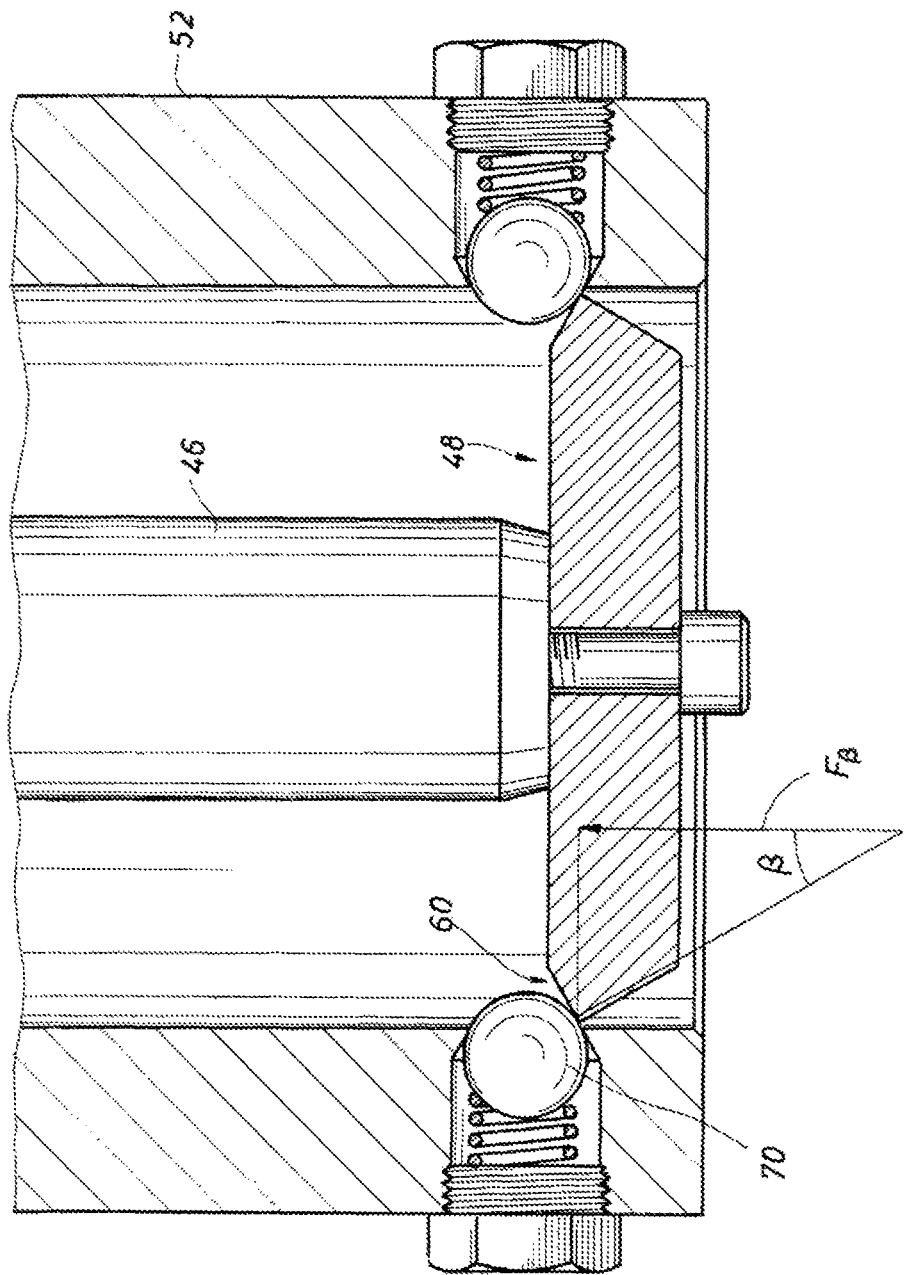
FIG. 3 is a side sectional view of a detailed portion of a balance stem of the embodiment of FIG. 1 shown in an unlocking configuration.

Similarly, in FIG. 3, cam disk 48 is illustrated below the ball bearings 70 so that its upper portion 60 is engaging the bearings 70 and a force diagram is provided that illustrates a force necessary to push the ball bearings 70 radially outward and allow the cam disk 40 to move upward within the housing 52. In the example of FIG. 3, the angle β of the upper portion 60 as shown relative to the axis $A_X$ of the balance stem 46. As the angle α is greater than the angle β, the thrust force $F_β$ required for upward movement of the cam disk 48 as shown in FIG. 3 exceeds the force Fα for downward movement of the cam disk past the ball bearings 70. Thus, in one example of use, the valve gate 36 may be urged into its desired location and the cam disk 48 and retention assemblies 64 strategically located so that the cam disk 48 is in the configuration of FIG. 3, thereby requiring a greater force to "unlock" the valve then would be required for moving the valve into a locking position, i.e., in the configuration of FIG. 2 into the configuration of FIG. 3.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A valve assembly for use in a subterranean hydraulic fracturing system comprising:
   a body having a passage;
   a gate disposable in the body;
   a bore in the gate that selectively registers with the passage;
   a valve lock assembly comprising:
   a cam disk having an upper surface, a lower surface, and an outer periphery extending between the upper and lower surfaces having a mid-portion with an outer circumference greater than outer circumferences of the upper and lower surfaces, and which defines an upper beveled surface and a lower beveled surface that is at an angle with respect to an axis of the cam disk different from an angle between the upper beveled surface and the axis of the cam disk;

a balance stem connected between the cam disk and the gate;

a retention element urged into a path of the cam disk by a resilient member, so that when a force is applied to the gate to urge the cam disk against the retention element that is less than a designated amount, the retention element is retained in the path of the cam disk by the resilient member.

2. The valve assembly system of claim 1, wherein when a force is applied to the gate to urge the cam disk against the retention element that exceeds the designated amount, a force is exerted by the cam disk onto the retention element to overcome a force applied by the resilient member and the retention element is moved out of the path of the cam disk.

3. The valve assembly of claim 1, wherein the force applied to the gate to urge the cam disk against the retention element defines a thrust force, and wherein upper and lower beveled surfaces are beveled at angles with respect to the axis of the cam disk so that the thrust force necessary to urge the cam disk past the retention element is greater in one axial direction than in an opposite axial direction.

4. The valve assembly of claim 1, wherein the retention element comprises a ball bearing and the resilient member comprises a spring.

5. The valve assembly of claim 1, wherein a distance between the mid-portion and upper surface is different from a distance between the lower surface and mid-portion; and further comprising a plurality of ball bearings and springs, and a housing that circumscribes the balance stem having bores radially formed through a sidewall of the housing for retaining the ball bearings and springs.

6. The valve assembly of claim 1, further comprising a valve actuator coupled to the gate.

7. A balancing system for use with a hydraulic fracturing valve comprising:

a generally planar cam member having upper and lower surfaces, and a beveled edge on an outer radial periphery of the cam member that depends radially inward with distance towards the upper and lower surfaces to define upper and lower beveled surfaces that are disposed at differing angles with respect to an axis of the cam member;

a coupling for engaging the cam member with a valve gate, and which is subject to a thrust force from the valve gate in response to a force applied to the valve gate; and a latching assembly comprising a latching element that is maintained in interfering contact with the cam member by a resilient member when the thrust force produces a resultant force against the latching element that is less than a designated amount.

8. The balancing system of claim 7, wherein the latching element is urged out of interfering contact and out of a path of the cam member when the thrust force produces a resultant force against the latching element that exceeds the designated amount.

9. The balancing system of claim 7, wherein the upper beveled surface comprises an upper section profiled at an angle with respect to the upper surface of the cam member and the lower beveled surfaces comprises a lower section profiled at an angle with respect to the lower surface of the cam member.

10. The balancing system of claim 9, wherein the upper and lower surfaces are substantially parallel, and wherein the upper and lower sections are profiled at different angles, so that an amount of the thrust force that produces a resultant force against the latching element that exceeds the designated amount is greater when the cam member is axially urged in one direction than when the cam member is axially urged in an opposite direction.

11. The balancing system of claim 9, wherein the gate is subjected to forces from vibrations that produce resultant forces that are less than the designated amount.

12. A valve assembly for use in a hydraulic fracing system comprising:

a valve body having a passage;

a gate having a bore that is in selective registration with the passage;

an actuator coupled with the gate; and a retention system for retaining the gate in a designated position within the valve body that is unlockable from the designated position with a force applied to the gate that is greater than a force applied to lock the gate and that comprises:

a cam disk having an upper surface, a lower surface, and an outer periphery extending between the upper and lower surfaces having a mid-portion with an outer circumference greater than outer circumferences of the upper and lower surfaces, and which defines upper and lower beveled surfaces that are at differing angles with respect to an axis of the cam disk;

a balance stem connected between the cam disk and the gate;

a retention element urged into a path of the cam disk by a resilient member, so that when a force is applied to the gate to urge the cam disk against the retention element that is less than a designated amount, the retention element is retained in the path of the cam disk by the resilient member.

13. The valve assembly of claim 12, wherein the retention element and resilient member define a latch that retains the cam disk in place when the lock force is applied to the gate and releases the gate when an unlock force is applied to the gate.

* * * * *